United States Patent [19]

De Silva

[11] Patent Number: 5,758,031
[45] Date of Patent: May 26, 1998

[54] RULE GENERATING APPARATUS AND METHOD

[75] Inventor: Suran De Silva, Ontario, Canada

[73] Assignee: Omron Corporation, Kyoto, Japan

[21] Appl. No.: 428,068

[22] PCT Filed: Nov. 9, 1993

[86] PCT No.: PCT/JP93/01626

§ 371 Date: Aug. 10, 1995

§ 102(e) Date: Aug. 10, 1995

[87] PCT Pub. No.: WO94/11809

PCT Pub. Date: May 26, 1994

[30] Foreign Application Priority Data

Nov. 10, 1992 [JP] Japan ................... 4-299406
Mar. 11, 1993 [JP] Japan ................... 5-050846

[51] Int. Cl.⁶ .................................................. G06F 15/18
[52] U.S. Cl. .................................................. 395/75; 395/3
[58] Field of Search ............................. 395/68, 75, 3, 395/2.54, 50, 60; 345/357

[56] References Cited

U.S. PATENT DOCUMENTS

| | | | |
|---|---|---|---|
| 4,775,935 | 10/1988 | Yourick | 345/357 |
| 4,970,657 | 11/1990 | Wolf | 395/61 |
| 5,022,498 | 6/1991 | Sasaki et al. | 187/387 |
| 5,208,898 | 5/1993 | Funabashi et al. | 395/50 |
| 5,222,197 | 6/1993 | Teng et al. | 395/68 |
| 5,303,332 | 4/1994 | Kirk et al. | 395/60 |
| 5,329,612 | 7/1994 | Kakazu et al. | 395/75 |
| 5,479,568 | 12/1995 | Hisano | 395/3 |
| 5,504,840 | 4/1996 | Hiji et al. | 395/77 |
| 5,506,936 | 4/1996 | Hisano | 395/3 |
| 5,544,281 | 8/1996 | Maruoka et al. | 395/68 |
| 5,581,655 | 12/1996 | Cohen et al. | 395/2.54 |

FOREIGN PATENT DOCUMENTS

| | | | |
|---|---|---|---|
| 373628 | 6/1990 | European Pat. Off. | G06F 9/44 |
| 506038 | 9/1992 | European Pat. Off. | G05B 13/02 |
| 2-161529 | 6/1990 | Japan | G06F 9/44 |
| 2-207302 | 8/1990 | Japan | G06F 9/44 |

OTHER PUBLICATIONS

IEEE Transactions On Systems, Man And Cybernetics, vol. 22, No. 4, Jul. 1992 New York, USA, pp. 621–635.
IEEE Transactions On Systems, Man And Cybernetics, vol. 20, No. 1, Jan. 1990, New York, USA, pp. 33–44.
International Neural Network Conference INNC 90, vol. 1, 9 Jul. 1990, Paris, France, pp. 379–382.

Primary Examiner—Allen R. MacDonald
Assistant Examiner—Sanjiv Shah
Attorney, Agent, or Firm—Dickstein Shapiro Morin & Oshinsky

[57] ABSTRACT

A plurality of rule groups are stored in a hard disk (14) in advance, and each group generally includes a plurality of rules. A data file is stored on a floppy disk (16) and includes input- and output-variable data. The input- and output-variable data is a set of input-variable data and output-variable data, the latter of which is obtained when the input-variable data is applied and an operation in accordance with rules desired to be generated is carried out. The data file on the floppy disk (16) is read by a floppy disk drive (15). Using the input-variable data, the CPU (11) performs an operation in accordance with each rule group stored on the hard disk (14). The operational results and the output-variable data are compared and the degree of effectiveness of each rule group is calculated on the basis of the comparison. The best rule group is selected based upon the degree of effectiveness.

17 Claims, 19 Drawing Sheets

Fig. 2

```
include (stdio.h)
main ( )
{
    FILE *fp;
    char
    if ( ( fp = fopen( " b:test.dat " , " W " ) ) == NULL )
        {
            Printf ( " can not open ! " ) ;
            exit ( ) ;
        }
    # if def RULE BLOCK
        DATA FILE = " X.dat "
        INPUT VARIABLES = { INPUT I₁ , . INPUT I₂ }
        OUTPUT VARIABLES = { OUTPUT O₁ }
    # end RULE BLOCK
    while ( ( C = getchar( ) ) /= EOF
        putc (c,fp) ;
    fclose (fp) ;
}
```

β = include...exit/}; α = #if def...#end RULE BLOCK

ORIGINAL SOURCE PROGRAM (X.C)

Fig. 3

```
include (stdio.h)
main ( )
{
    FILE *fp;
    char
    if ( ((fp = fopen ( "b:test.dat" , "W" ) ) == NULL)
    {
        Printf ( "can not open !" ) ;
        exit ( ) ;
    }
}                                                          ⎫
                                                           ⎬ β
/* BEST RULE FOR (X.dat) IS RULE "R10"                     ⎭
   (FIELD OF USE OF RULE: "HUMID. CONTROL" )
   DEGREE OF EFFECTIVENESS = 85% */
if $I_1$ = SMALL and $I_2$ = MEDIUM then $O_1$ = LARGE
if $I_1$ = MEDIUM and $I_2$ = LARGE then $O_1$ = MEDIUM
.. : ........ : :: ........ :: ........
.. : ........ : :: ........ :: ........
while ( ( (C = getchar( ) ) /= EOF
    putc (c,fp);
fclose (fp) ;                                              ⎫
}                                                          ⎬ α
                                                           ⎭
                               GENERATED SOURCE PROGRAM($X_1$, $C_1$)
```

Fig.4

(X.dat)

| INPUT $I_1$ | INPUT $I_2$ | OUTPUT $O_1$ |
|---|---|---|
| 30 | 40 | 0.9 |
| 60 | 40 | 1.0 |
| 20 | 30 | 0.43 |
| ⋮ | ⋮ | ⋮ |

Fig. 5

| RULE GROUP NO. | FIELD OF USE OF RULE | RULES | MEMBERSHIP FUNCTION DATA |
|---|---|---|---|
| R10 | HUMID. CONTROL | rule1 : if $I_1$ = SMALL and $I_2$ = MEDIUM then $O_1$ = LARGE<br>rule2 : if $I_1$ = MEDIUM and $I_2$ = LARGE then $O_1$ = MEDIUM<br>...... | $I_1$ SMALL = (0, 20, 40) MEDIUM = (20, 40, 60) LARGE = (40, 60, 80)<br>$I_2$ SMALL = (0, 10, 25) MEDIUM = (14, 27, 44) LARGE = (30, 47, 80)<br>$O_1$ SMALL = (0.0, 0.3, 0.6) MEDIUM = (0.4, 0.6, 0.8) LARGE = (0.6, 0.9, 1.2) |
| R20 | TEMP. CONTROL SMOOTH RESPONSE | rule1 : if $I_1$ = MEDIUM and $I_2$ = SMALL then $O_1$ = MEDIUM<br>rule2 : if $I_1$ = SMALL and $I_2$ = SMALL then $O_1$ = SMALL<br>rule3 : if $I_1$ = LARGE and $I_2$ = MEDIUM then $O_1$ = LARGE<br>...... | $I_1$ SMALL = ( .. , .. , .. ) MEDIUM = ( .. , .. , .. ) LARGE = ( .. , .. , .. )<br>$I_2$ SMALL = ( .. , .. , .. ) MEDIUM = ( .. , .. , .. ) LARGE = ( .. , .. , .. )<br>$O_1$ SMALL = ( .. , .. , .. ) MEDIUM = ( .. , .. , .. ) LARGE = ( .. , .. , .. ) |
| R30 | REAL TIME CONTROL | ...... | ...... |

Fig.7

| RULE GROUP NO. | INPUT-VRIABLE DATA | | OUTPUT-VARIABLE DATA | INFERENTIAL RESULT IR | RATIO $T_1$ | DEGREE OF EFFECTIVENESS OF RULE GROUP [%] |
|---|---|---|---|---|---|---|
| | INPUT $I_1$ | INPUT $I_2$ | OUTPUT $O_1$ | | | |
| R10 | 30 | 40 | 0.9 | 0.8 | 0.89 | 85 |
| | 60 | 40 | 1.0 | 0.7 | 0.7 | |
| | 20 | 30 | 0.43 | 0.5 | 0.86 | |
| R20 | 30 | 40 | 0.9 | 0.5 | 0.56 | 50 |
| | 60 | 40 | 1.0 | 0.5 | 0.5 | |
| | 20 | 30 | 0.43 | 0.2 | 0.47 | |

Fig. 10

```
# include  (stdio.h)
main ( )
 {
    FILE *fp;
    char
    if ( ( fp = fopen( " b:test.dat" ,W " ) ) == NULL )
        {
          Printf ( "can not open ! " );
          exit ( );
}
# if def RULE BLOCK
    DATA FILE =  "X.dat 3"
    FIELD OF USE : TEMP. CONTROL
    NUMBER OF TYPES OF INPUT VARIABLES  : 2
    NUMBER OF TYPES OF OUTPUT VARIABLES : 1
HINTS : NUMBER OF RULES : 10
        INPUT   VARIABLE AREA
            INPUT   VARIABLE I₁ : 0 → 66
            INPUT   VARIABLE I₂ : 0 → 56
        OUTPUT VARIABLE AREA
            OUTPUT VARIABLE O₁ : 0 → 1.5
        NUMBER OF TYPES OF ANTECEDENT MEMBERSHIP FUNCTIONS
            INPUT   VARIABLE I₁ : 3
            INPUT   VARIABLE I₂ : 3
        NUMBER OF TYPES OF CONSEQUENT MEMBERSHIP FUNCTIONS
            OUTPUT VARIABLE O₁ : 3
        # end RULE BLOCK
while ( ( C = getchar ( ) ) /= EOF
     putc (c,fp) :
fclose (fp) ;
}
```

ORIGINAL SOURCE PROGRAM (X.E)

Fig. 11

```
include (stdio.h)
main ( )
 {
    FILE *fp
    char
    if ( ( fp = fopen ( "b:test.dat" ,"W" ) ) == NULL )
          {
            Printf ( "can not open ! " ) ;
            exit ( ) ;
 }
/* BEST RULE FOR "(X.E)" IS RULE "R3"
    ( FIELD OF USE OF RULE : "TEMP. CONTROL" )
    OVERALL DEGREE OF AGREEMENT 93%
    DEGREE OF EFFECTIVENESS 86%      */
    if I₁ = SMALL and I₂ = MEDIUM then O₁ = LARGE
    if I₁ = MEDIUM and I₂ = LARGE then O₁ = MEDIUM
    .. ..     .... .. ..    ....  .. ..      ....
    .. ..     .... .. ..    ....  .. ..      ....
    .. ..     .... .. ..    ....  .. ..      ....
    .. ..     .... .. ..    ....  .. ..      ....
    .. ..     .... .. ..    ....  .. ..      ....
while ( ( C = getchar ( ) ) /= EOF
      putc (c,fp) :
fclose (fp) ;
}
```

GENERATED SOURCE PROGRAM $(X_1.E_1)$

Fig. 12

(X.dat 3)

| INPUT I₁ | INPUT I₂ | OUTPUT O₁ |
|---|---|---|
| 20 | 30 | 0.25 |
| 40 | 50 | 0.75 |
| 50 | 80 | 0.30 |
| 42 | 48 | 1.0 |
| 0 | 40 | 0.1 |
| ⋮ | ⋮ | ⋮ |

Fig.13a

RULE GROUP CHARACTERISTICS

| RULE GROUP NO. | FIELD OF USE | NUMBER OF TYPES OF INPUT VARIABLES | NUMBER OF TYPSE OF OUTPUT VARIABLES | INPUT-VARIABLE AREA | OUTPUT-VARIABLE AREA | NUMBER OF TYPES OF ANTECEDENT MEMBERSHIP FUNCTIONS | NUMBER OF TYPES OF CONSEQUENT MEMBERSHIP FUNCTIONS | RULES | MEMBERSHIP FUNCTION DATA |
|---|---|---|---|---|---|---|---|---|---|
| R3 | TEMP. CONTROL | 2 | 1 | INPUT $I_1$ 0→60 INPUT $I_2$ 0→50 | OUTPUT $O_1$ 0→0.8 | INPUT $I_1$ 3 INPUT $I_2$ 3 | OUTPUT $O_1$ 3 | FIRST RULE if $I_1$ = SMALL and $I_2$ = MEDIUM then $O_1$ = LARGE<br><br>SECOND RULE if $I_1$ = MEDIUM and $I_2$ = LARGE then $O_1$ = LARGE<br><br>...... | $I_1$, SMALL = ( 0,20,40 ) MEDIUM = ( 24,34,44 ) LARGE = ( 40,50,60 )<br><br>$I_2$, SMALL = ( 0,10,25 ) MEDIUM = ( 14,27,44 ) LARGE = ( 30,17,80 )<br><br>$O_1$, SMALL = ( 0.0,0.3,0.6 ) MEDIUM = ( 0.4,0.6,0.8 ) LARGE = ( 0.6,0.9,1.2 ) |

*Fig.13b*

| ID | Name | | | Inputs | Output | Inputs | Output | Rules | Membership functions |
|---|---|---|---|---|---|---|---|---|---|
| R57 | TEMP. CONTROL | 2 | 1 | INPUT $I_1$ 0→64<br>INPUT $I_2$ 0→64 | OUTPUT $O_1$ 0→2.0 | INPUT $I_1$ 3<br>INPUT $I_2$ 3 | OUTPUT $O_1$ 3 | FIRST RULE<br>if $I_1$ = MEDIUM and<br>$I_2$ = MEDIUM then<br>$O_1$ = LARGE<br><br>SECOND RULE<br>if $I_1$ = SMALL and<br>$I_2$ = MEDIUM then<br>$O_1$ = MEDIUM | $I_1$, SMALL = ( 0, 22, 35 )<br>MEDIUM = ( 25, 30, 43 )<br>LARGE = ( 40, 52, 64 )<br><br>$I_2$, SMALL = ( 0, 20, 37 )<br>MEDIUM = ( 20, 35, 50 )<br>LARGE = ( 40, 55, 75 )<br><br>$O_1$, SMALL = ( 0.0, 0.3, 0.6 )<br>MEDIUM = ( 0.4, 0.7, 1.0 )<br>LARGE = ( 0.7, 1.0, 1.3 ) |
| R124 | BREAK. CONTROL | 3 | 1 | ⋮ | ⋮ | ⋮ | ⋮ | ⋮ | ⋮ |

NUMBER OF RULES

INPUT-VARIABLE AREA

Fig. 15

| RULE GROUP NO. | DEGREE OF AGREEMENT OF NUMBER OF RULES | DEGREE OF AGREEMENT OF INPUT-VARIABLE AREA | DEGREE OF AGREEMENT OF OUTPUT-VARIABLE AREA | DEGREE OF AGREEMENT OF NUMBER OF TYPES OF ANTECEDENT MEMBERSHIP FUNCTIONS | DEGREE OF AGREEMENT OF NUMBER OF TYPES OF CONSEQUENT MEMBERSHIP FUNCTIONS | OVERALL DEGREE OF AGREEMENT (%) | DEGREE OF EFFECTIVENESS OF RULE GROUP (%) |
|---|---|---|---|---|---|---|---|
| R3 | 1.0 | 0.96 ($I_1$) 0.96 ($I_2$) | 0.93 ($O_1$) | 1.0 ($I_1$) 1.0 ($I_2$) | 1.0 ($O_1$) | 93 | 86 |
| R57 | 1.0 | 0.99 ($I_1$) 0.94 ($I_2$) | 0.89 ($O_1$) | 1.0 ($I_1$) 1.0 ($I_2$) | 1.0 ($O_1$) | 89 | 79 |
| ⋮ | ⋮ | ⋮ | ⋮ | ⋮ | ⋮ | ⋮ | ⋮ |

RULE GENERATING APPARATUS AND METHOD

DESCRIPTION

1. Technical Field

This invention relates to an apparatus and method for automatically generating or creating rules, especially rules for fuzzy reasoning.

2. Background Art

Fuzzy reasoning or fuzzy control has come to be used in expert systems, fault diagnosis and control of various equipment in many fields. Appropriate rules are necessary in order to execute appropriate fuzzy reasoning or fuzzy control. However, the creation or construction of rules often is accompanied by difficulties unless done by a technician possessing a great stock of knowledge in the field of application.

A method of creating rules based upon accumulated experience, intuition and knowledge is disadvantageous in that rules can only be created by a limited few because it is required that the creator be a specialist having abundant experience and know-how.

There is also a method which involves creating initial rules provisionally within the limits of common knowledge and then revising the rules while applying data to them. Though this method does not necessarily require special knowledge or experience, trial and error must be repeated. A problem which arises is that time and labor are required.

DISCLOSURE OF THE INVENTION

The present invention provides a rule generating apparatus and method for deciding appropriate rules without requiring special knowledge and in a rapid manner.

A rule generating apparatus according to the present invention comprises a rule-group storage unit in which plural groups of rules, each group including a plurality of rules, are stored in advance; an input unit for entering input-variable data and output-variable data used in rule generation; a first operating unit for performing operations, in accordance with respective ones of the rule groups stored in the rule-group storage unit, using the input-variable data entered by the input unit; a second operating unit for comparing operational results from the first operating unit and the output-variable data entered from the input unit, and calculating degree of effectiveness of each rule group; and a selecting unit for selecting an appropriate rule group on the basis of the degree of effectiveness obtained by the second operating unit.

The apparatus preferably is further provided with a memory unit for storing the rule group selected by the selecting unit, or with an output unit for outputting the selected rule group.

A rule generating method according to the present invention comprises the steps of storing plural groups of rules, each group including a plurality of rules, in a storage unit in advance; accepting entry of input-variable data and output-variable data used in rule generation; performing operations, in accordance with respective ones of rule groups stored in the rule-group storage unit, using the entered input-variable data; comparing operational results and the entered output-variable data and calculating degree of effectiveness of each rule group; and selecting an appropriate rule group on the basis of the degree of effectiveness obtained.

In accordance with the present invention, a plurality of rule groups created in the past are stored in a rule-group storage unit in advance, and a rule group best suited to the entered input- and output-variable data is selected automatically from these rule groups. Accordingly, rules can be generated even without the possession of special knowledge, and a substantially appropriate rule group is obtained. In addition, accurate, rapid processing can be expected.

Preferably, part of a selected rule group is revised as needed. The revised rule group also would be stored in the rule-group storage unit.

In an embodiment of the present invention, the input unit is constituted by a recording medium in which the input- and output-variable data is stored, and a reading device for reading the input- and output-variable data from the recording medium. This makes it possible to carry about the input- and output-variable data for rule generation.

In accordance with another embodiment of the present invention, the rule generating apparatus comprises a host device and a terminal device connected to the host device so as to be capable of communicating therewith. The host device has the rule-group storage unit, the first operating unit, the second operating unit and the selecting unit. The terminal device has the input unit.

In accordance with this embodiment, the necessary data is entered from the terminal device, the host device is made to generate the rules and the generated rules can be read by the terminal device.

In accordance with another embodiment, the rule generating apparatus comprises a host device and a terminal device connected to the host device so as to be capable of communicating therewith. The host device has the rule-group storage unit, and the terminal device has the input unit, the first operating unit, the second operating-unit and the selecting unit.

In accordance with this embodiment, a rule group transmitted from the host device is accepted and the rules can be generated in the terminal device.

A further developmentally expanded invention is provided. The rule generating apparatus according to this expanded invention comprises rule-group storage unit in which plural groups of rules, each group including a plurality of rules, are stored in advance; a first input unit for entering specifications for rule generation; a second input unit for entering input-variable data and output-variable data used in rule generation; a first selecting unit for selecting rule groups, which satisfy the specifications entered by the first input unit, from among the rule groups stored in the rule-group storage unit; a first operating unit-for performing operations, in accordance with respective ones of the rule groups selected by the first selecting unit, using the input-variable data entered by the second input unit; a second operating unit for comparing operational results from the first operating unit and the output-variable data entered from the second input unit, and calculating degree of effectiveness of each rule group; and a second selecting unit for selecting an appropriate rule group on the basis of the degree of effectiveness obtained by the second operating unit.

The apparatus preferably is further provided with a memory unit for storing the rule group selected by the second selecting unit, or with an output unit for outputting the selected rule group.

A rule generating method according to the present invention comprises the steps of storing plural groups of rules, each group including a plurality of rules, in advance; accepting entry of specification for rule generation; accepting entry of input-variable data and output-variable data used in rule generation; selecting rule groups, which satisfy the entered specifications, from among the rule groups stored in the rule-group storage unit; performing operations, in accordance with respective ones of the selected rule groups, using the entered input-variable data; comparing operational results and the entered output-variable data and calculating degree of effectiveness of each rule group; and selecting an appropriate rule group on the basis of the degree of effectiveness obtained.

In accordance with the present invention, specifications of rules desired to be generated are entered and one or a plurality of rule groups conforming to these specifications is selected. With regard to the one or plurality of rule groups selected, the degree of effectiveness of the rule group is calculated and the most appropriate rules are eventually decided on the basis of the degree of effectiveness. Since processing for calculating degree of effectiveness is performed solely with regard to rule groups that satisfy the specifications, the processing is simplified. Since rule groups not satisfying the specifications are excluded from the outset, unsuitable rule groups are not selected in the end and, hence, the generation of more appropriate rules is attained.

In a preferred embodiment, the above-mentioned specifications include essential matters and conditional matters, the first selecting unit selects rule groups that satisfy all of the essential matters, and the first selecting unit or second selecting unit selects a rule group on the basis of the conditional matters.

In this embodiment of the invention, the first input unit comprises a recording medium in which specifications data is stored, and a reading device for reading the specifications data from the recording medium. The second input unit comprises a recording medium in which the input- and output-variable data is stored, and a reading device for reading the input- and output-variable data from the recording medium.

Thus, each operator may possess his or her own input unit and can carry the input unit about.

In another embodiment of the invention, the rule generating apparatus comprises a host device and a terminal device connected to the host device so as to be capable of communicating therewith. The host device has the rule-group storage unit, the first selecting unit, the first operating unit, the second operating unit and the second selecting unit. The terminal device has the first and second input unit.

In accordance with this embodiment, the arrangement is such that if the data necessary for rule generation is entered from the terminal device, the data is transmitted to the host device and processing for generating rule is executed by the host device. Since the rule groups generated are transmitted to the terminal device, the rule groups generated can be accepted by the terminal device.

In a further embodiment of the present invention, the rule generating apparatus comprises a host device and a terminal device connected to the host device so as to be capable of communicating therewith. The host device has a rule-group storage unit, and the terminal device has the first and second input unit, the first selecting unit, the first and second operating unit and the second selecting unit.

Accordingly, the terminal device is capable of performing rule generation using a plurality of rule groups transmitted from the host device.

In yet another embodiment of the present invention, the rule generating apparatus comprises a host device and a terminal device connected to the host device so as to be capable of communicating therewith. The host device has a rule-group storage unit and the first selecting unit, and the terminal device has the first and second input unit, the first and second operating unit and the second selecting unit.

Accordingly, when specifications for rule generation are entered by the terminal device, the specifications are transferred to the host device and rule groups that satisfy the specifications are selected in the host device. The rule groups selected are transmitted to the terminal device. As a result, rule generation processing can be executed by the terminal device using solely the rule groups that satisfy the specifications.

BRIEF DESCRIPTION OF THE DRAWINGS

FIG. 2 illustrates an example of an original source program describing rule generating conditions;

FIG. 3 illustrates an example of a source program which includes rule groups that have been generated;

FIG. 4 illustrates an example of a data file;

FIG. 5 illustrates an example of rule groups used in rule generation;

FIG. 7 illustrates data, in the form of a table, created at the time of rule generation for the purpose of obtaining degrees of effectiveness of rule groups;

FIG. 10 illustrates an example of an original source program describing rule generating conditions;

FIG. 11 illustrates an example of a source program which includes rule groups that have been generated;

FIG. 12 illustrates an example of a data file;

FIGS. 13a and 13b illustrate examples of rule groups used in rule generation;

FIG. 15 illustrates various degrees of agreement, in the form of a table, created at the time of rule generation for the purpose of obtaining overall degree of agreement;

BEST MODE FOR CARRYING OUT THE INVENTION

First Embodiment

Figure 1:
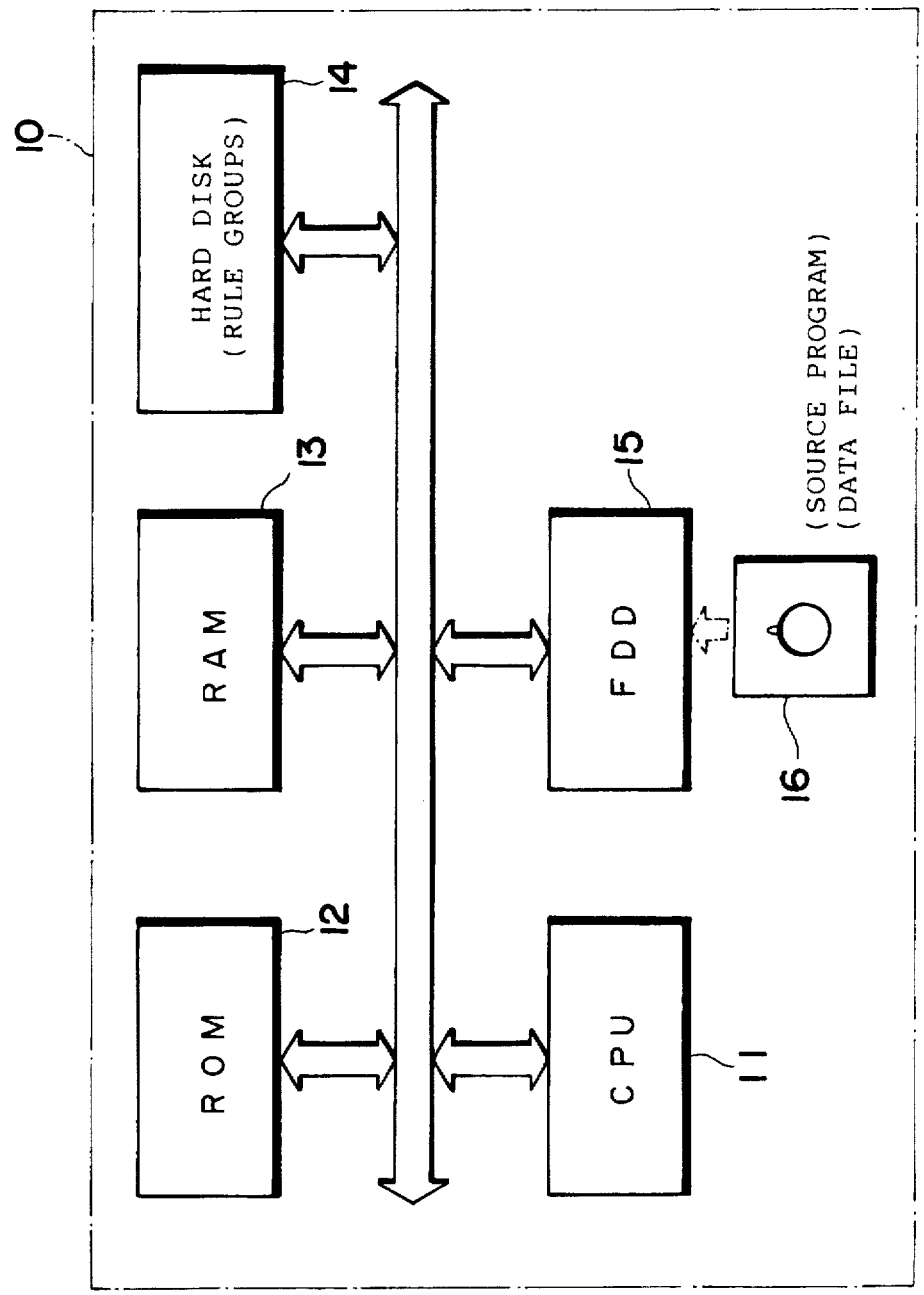
FIG. 1 is a block diagram illustrating the construction of a rule generating apparatus according to a first embodiment.

FIG. 1 illustrates the construction of a rule generating apparatus according to a first embodiment of the present invention. The rule generating apparatus 10 is implemented by a computer system and comprises a CPU 11, a ROM 12, a RAM 13, a hard disk (magnetic disk storage device) 14 and a floppy disk drive (hereinafter referred to as an "FDD") 15.

The rule generating apparatus 10 performs the following operation: A plurality (at least one) of rule groups are set in the rule generating apparatus 10 in advance. Each rule group is composed of a plurality (at least one) of rules. A set of input-variable data and output-variable data is entered into the rule generating apparatus 10. In general, the types of input variables are plural in number but there are also cases in which there is only one type. Each item of output-variable data corresponds to an item of input-variable data and represents an expected value that is desired to be obtained when the corresponding item of input-variable data has been applied. When a set of input-variable data and output-variable data has been entered, the rule generating apparatus 10 selects a rule group that is best for implementing the set from the plurality of rule groups that have been set in advance. This represents the generation of rules. When the input-variable data is applied to the selected rule group, and an inference operation is performed in accordance with the selected rule group, inferential results having a value close to the value represented by the output-variable data corresponding to the input-variable data are obtained.

The CPU 11 executes the above-described rule generation processing in accordance with a program stored in the ROM 12 beforehand. The RAM 13 temporarily stores data obtained in the course of rule generation processing. A plurality of rule groups are stored in the hard disk 14 in advance. The FDD 15 is used to enter the set (referred to as a data file) of input-variable data and output-variable data and to output data representing the selected rule group. The medium for this input and output of data is a floppy disk (hereinafter referred to as an "FD") 16.

In this embodiment, conditions for rule generation are stored in the FD 16 in the form of an original source program (X.C). The original source program (X.C) of the FD 16 is read by the FDD 15 and entered into the rule generating apparatus 10.

FIG. 2 illustrates an example of the original source program (X.C). The original source program (X.C) contains an ordinary instruction block β and a rule block α. The name (X.dat) of the data file, the types of input variables and the types of output variables are described in the rule block α.

When the data file is described directly in the original source program (X.C), the program becomes too long. In order to avoid this, only the name of the data file is described in the original source program (X.C). The data file is recorded in another area of the FD 16. The types of input variables ($I_1$ and $I_2$) and the type of output variable ($O_1$) are input-, output-variable names used in the data file.

An example of a data file having the data file name (X.dat) is illustrated in FIG. 4. The input and output data on each line constructs a set. On the first line, for example, it is expected that $O_1=0.9$ will be obtained when $I_1=30$, $I_2=40$ holds.

FIG. 5 illustrates an example of a plurality of rule groups stored in the hard disk 14 in advance. A rule group number is assigned to each rule group, and the field of use of the rule group is described. Every rule group includes fuzzy reasoning rules (referred to simples as "rules") constituting the rule group, as well as data representing the membership functions used.

Figure 6A:
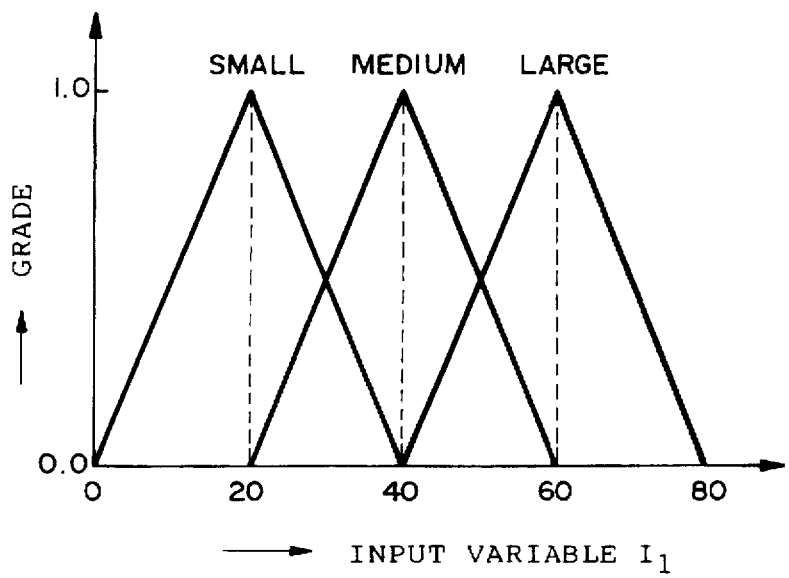
FIGS. 6a and 6b are graphs showing examples of membership functions.
Figure 6B:
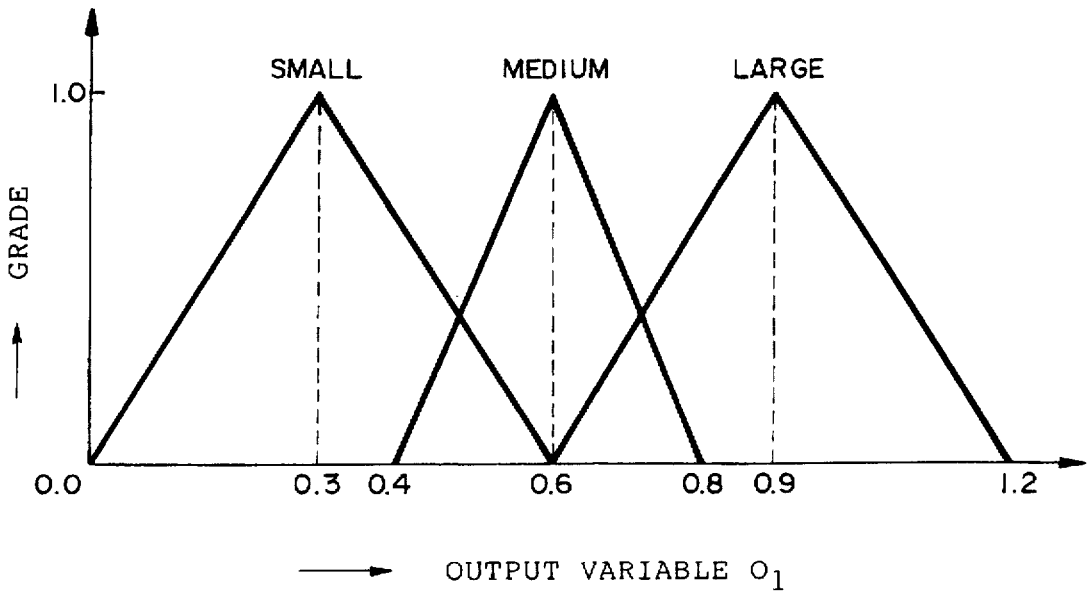

By way of example, a rule group number R10 is used in control of humidity and is composed of a plurality of rules which include rule 1 and rule 2. There are two input variables, namely $I_1$ and $I_2$, and one output variable, namely $O_1$. The membership functions used in these rules are of three types, namely SMALL, MEDIUM and LARGE. The membership functions are expressed by 5 triangles. The three numerals of the membership function data are variable values of the vertices of the triangle, wherein the vertices have grades of 0, 1 and 0. For example, the membership function SMALL of input variable $I_1$ is a triangle having vertices represented by 10 the coordinates (variable values, grades) (0.0), (20.1), (40.0). FIGS. 6a and 6b each illustrate three types of membership functions relating to the input variable $I_1$ and three types of membership functions relating to the output variable $O_1$, respectively, in the rule group number R10.

Figure 8:
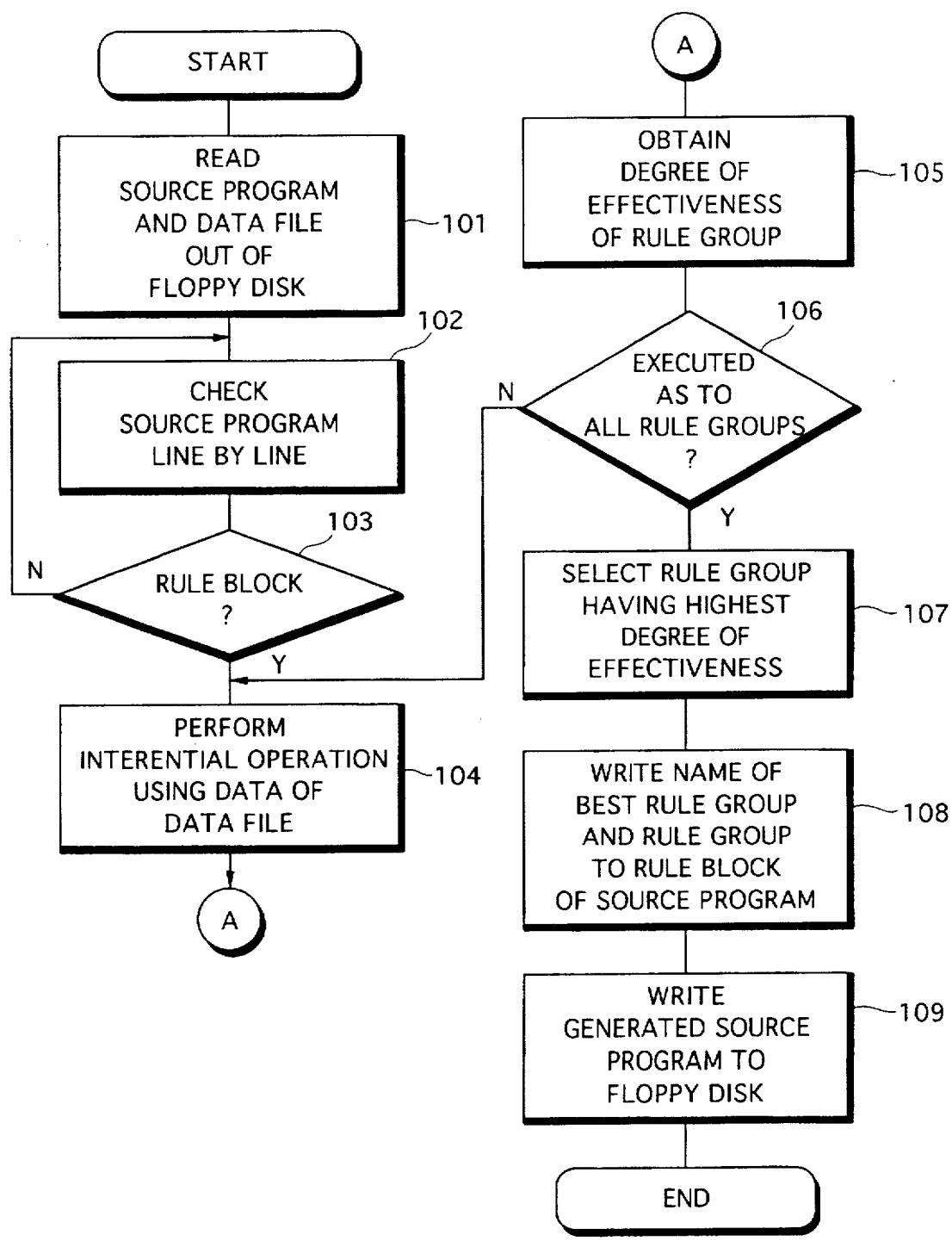
FIG. 8 is a flowchart illustrating a processing procedure for generating rules.

FIG. 8 illustrates a processing procedure executed by the CPU 11 of the rule generating apparatus 10 to generate rules (select rule groups).

First, the operator loads the FD 16, on which the original source program (X.C) and data file (X.dat) have been stored, into the FDD 15. The CPU 11 controls the FDD 15 to read the original source program (X.C) and data file (X.dat) from the FD 16 and temporarily store the program and the file in the RAM 13 (step 101).

The CPU 11 checks the original source program (X.C) line by line and determines whether the rule block α has been reached (steps 102, 103). The determination as to whether the rule block α has been reached is made on the basis of the symbol "#" at the beginning of the first line "#if def RULE BLOCK" and at the beginning of the last line "#end RULE BLOCK". The CPU 11 reads in the original source program (X.C) line by line starting from the first line "include (stdio. h)", checks to determine whether the symbol "#" is included in the line and renders a decision to the effect that the lines between the "#" found first and the "#" found next constitute a rule block.

On the basis of the description given in the rule block, the CPU 11 recognizes that the data file to be used is "X.dat", that the input variables are $I_1$ and $I_2$, and that the output variable is $O_1$. Accordingly, from among the rule groups that have been stored in the hard disk 14, the CPU 11 finds those rule groups for which there are two types of input variables and one type of output variable, applies the input-variable data of the data file (X.dat) to each of these rule groups and executes fuzzy reasoning (step 104). Though any operational method can be used for the fuzzy reasoning operation, a MIN-MAX operation is utilized most commonly. A center-of-gravity method, for example, would be used to defuzzify data.

One inferential result IR is obtained for one set of input-variable data in each rule group. FIG. 7 is a compilation of sets of input- and output-variable data and inferential results regarding these sets for all applicable rule groups. Such data is stored in the RAM In each rule group, a ratio $T_1$ between output-variable data and inferential result IR is calculated for each set of input- and output-variable data. In calculating the ratio $T_1$, the larger of the output-variable data and inferential result is used as the denominator and the smaller as the numerator so that the ratio $T_1$ obtained will always be a value less than 1.

Furthermore, for every rule group, the average value of the ratios $T_1$ is obtained as the degree of effectiveness (expressed by a percentage) of the rule group (step 105). The fuzzy reasoning and calculation of degree of effectiveness are executed with regard to all applicable rule groups by using the data of the data file (X.dat)(step 106).

The rule group having the highest degree of effectiveness among the degrees of effectiveness thus obtained is selected (step 107). Further, it is determined whether the highest degree of effectiveness selected is greater than a predetermined value (80%, for example). The rule group having the highest degree of effectiveness greater than the threshold value is decided on as being the best for the input- and output-variable data of the given data file (X.dat), and the rule group number of this group, the field of use of the rule, the rule group and the degree of effectiveness are written in the rule block a of the original source program (X.C) in RAM 13 (step 108).

In the example of FIG. 7, the rule group R10 exhibits the highest degree of effectiveness (85%), which is greater than the predetermined value.

Finally, the source program in which the selected best rule group has been written in the rule block α in RAM 13 is written in the FD 16 by the FDD 15 (step 109). An example of a source program ($X_1 \cdot C_1$) finally generated is illustrated in FIG. 3. Since the best rule group is thus written in the source program ($X_1 \cdot C_1$), the fuzzy reasoning operation and fuzzy control can be executed using this program.

Thus, in accordance with the rule generating apparatus of this embodiment, an FD in which a source program and a data file have been stored is loaded in the FDD of the apparatus, the best rule group is selected merely by starting up the apparatus and the best rule group is written to the FD. Accordingly, even an operator not possessing special knowledge is capable of obtaining the best rules in rapid fashion.

By revising part (e.g., the membership functions, etc.) of the selected best rules before or after the selected best rules are written to the FD, a rule group better suited to the input- and output-variable data of the data file can also be obtained. In this case, it is preferred that fuzzy reasoning be executed again in accordance with the revised rule group using the data of the data file, and that it be verified that the degree of effectiveness of the rule group has been raised. Conversely speaking, the rule group is revised in such a manner that the degree of effectiveness thereof is raised.

Second Embodiment

Figure 9:
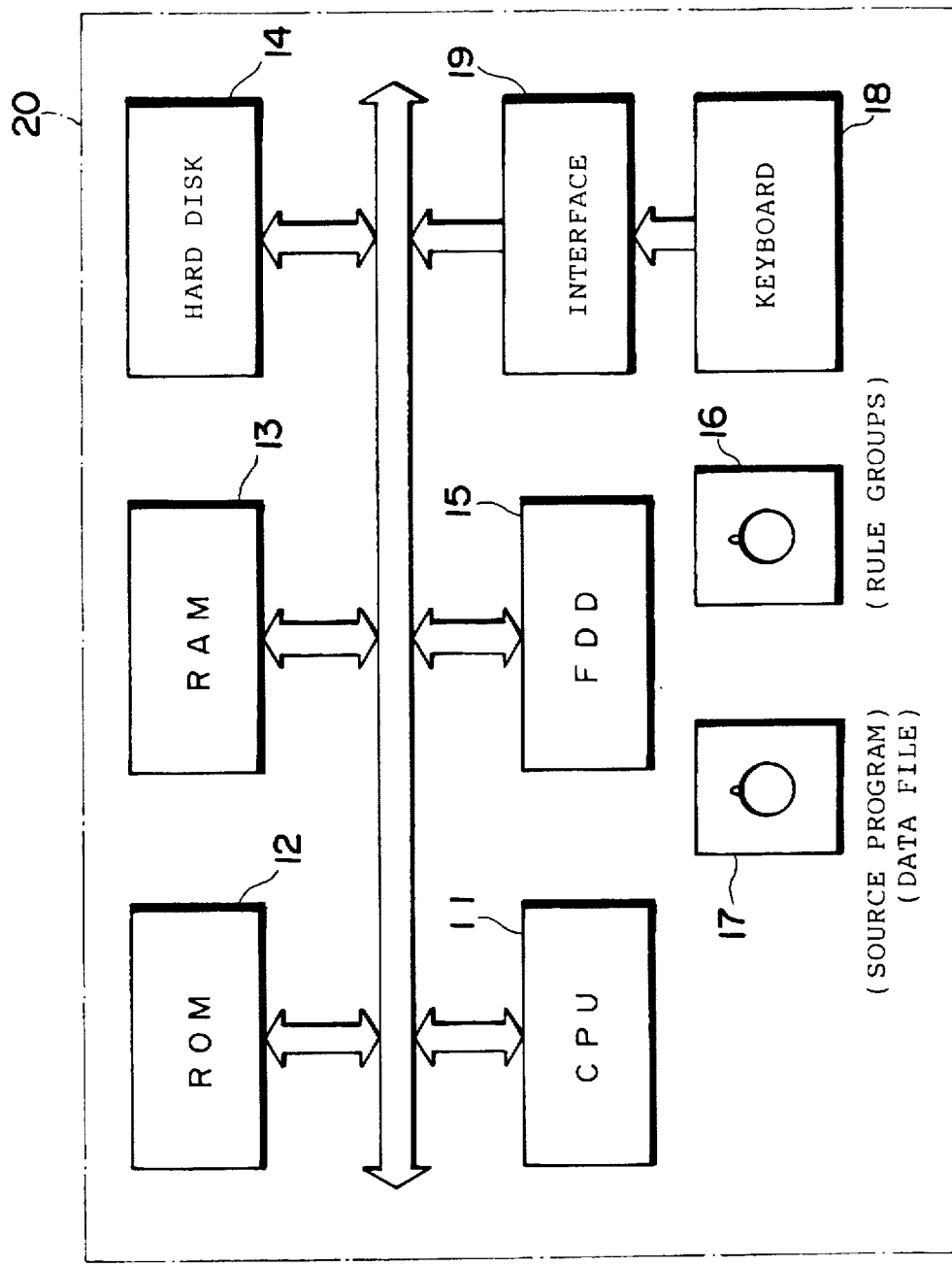
FIG. 9 is a block diagram illustrating the construction of a rule generating apparatus according to a second embodiment.

FIG. 9 illustrates the construction of a rule generating apparatus according to a second embodiment. Components in FIG. 9 identical with those shown in FIG. 1 are designated by like reference characters to avoid a redundant description. The following description focuses on the differences between this embodiment and the first embodiment.

The FDD 15 is capable of reading and writing two FDs 16 and 17. Rule groups (FIGS. 13a and 13b) described later are stored in the FD 16 in advance. The original source program (FIG. 10) and a data file (FIG. 12) are stored in the FD 17 in advance.

A keyboard 18 is provided in order that data, instructions and the like for revising generated rules may be entered. The keyboard 18 is connected to the CPU 11 via an interface 19.

As in the first embodiment, an original source program (X.E) shown in FIG. 10 contains an instruction block and a rule block. This original source program differs from that of the first embodiment in that essential matters and conditional matters for rule generation are described in the rule block of the original source program (X.E) of the second embodiment.

Essential matters comprises of the name of the data file (data file name=X.dat3) in which the input- and output-variable data used for rule generation have been stored, the field of use (TEMP. CONTROL) of the rules to be generated, the number (2) of types of input variables, and the number (1) of types of output variables. These essential matters must be used in rule generation or must be satisfied without fail.

Conditional matters are those which need to be satisfied to the best extent possible. In the original source program (X.E), these matters are described following the characters "HINTS". In this embodiment, conditional matters include the number of rules, areas regarding respective ones of the input variables of two types (namely areas in which antecedent membership functions are defined), areas for output variables (namely areas in which consequent membership functions are defined), the number of types of antecedent membership functions regarding each of the two types of input variables, and the number of types of consequent membership functions.

The data file shown in FIG. 12 has a structure identical with that of the data file in the first embodiment.

With reference to FIGS. 13a and 13b, data relating to a rule group contains the rule group number, rule group characteristics, rules and membership function data. The rule group characteristics are peculiar to the second embodiment. Rule group characteristics basically correspond to the essential matters and conditional matters of the original source program and are provided for each and every group.

Field of use included in the rule group characteristics indicates the field in which the rule group was used in the past. The rule group characteristics further include the following in the particular rule group: the number of types of input variables, the number of types of output variables, an input-variable area for each input variable, an output-variable area, the number of types of antecedent membership functions of each input variable, and the number of types of consequent membership functions.

Figure 16A:
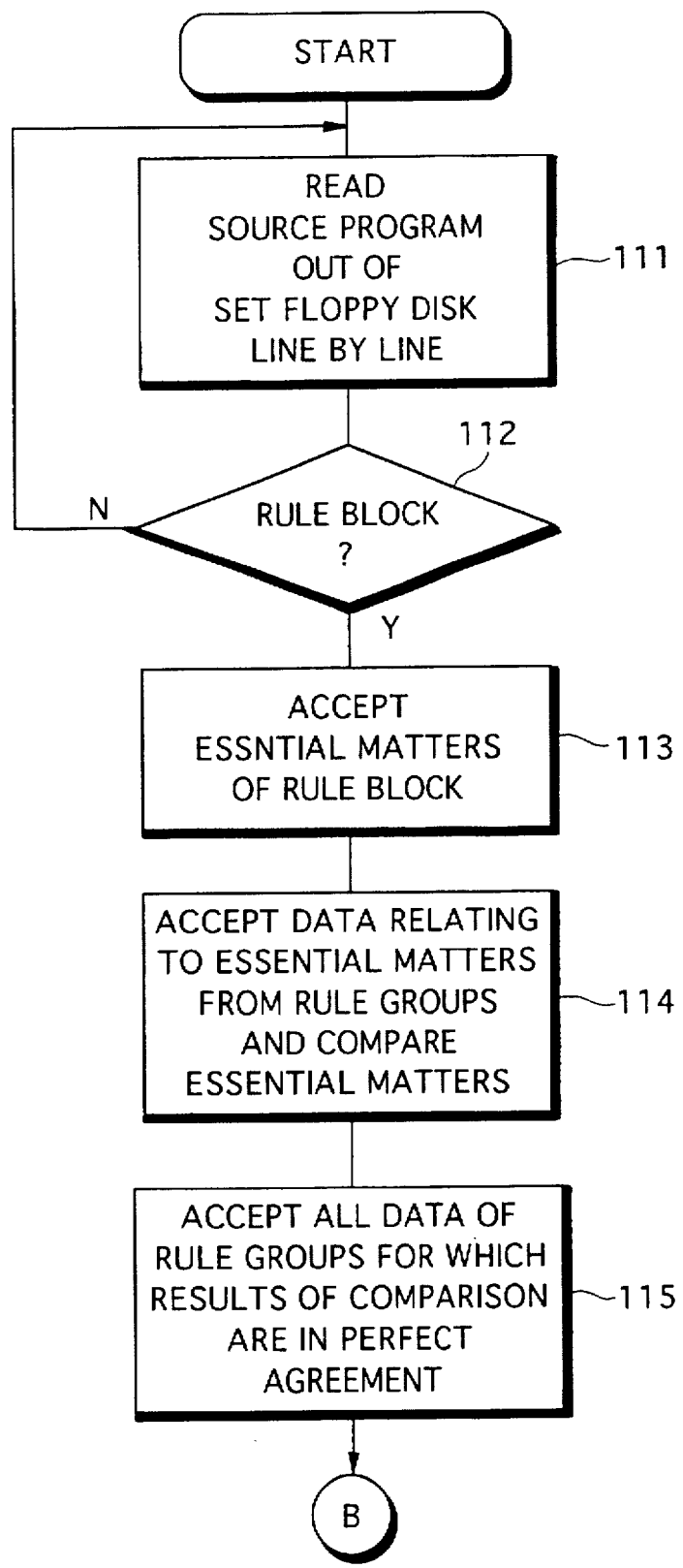
FIGS. 16a and 16b are flowcharts illustrating a processing procedure for generating rules.
Figure 16B:
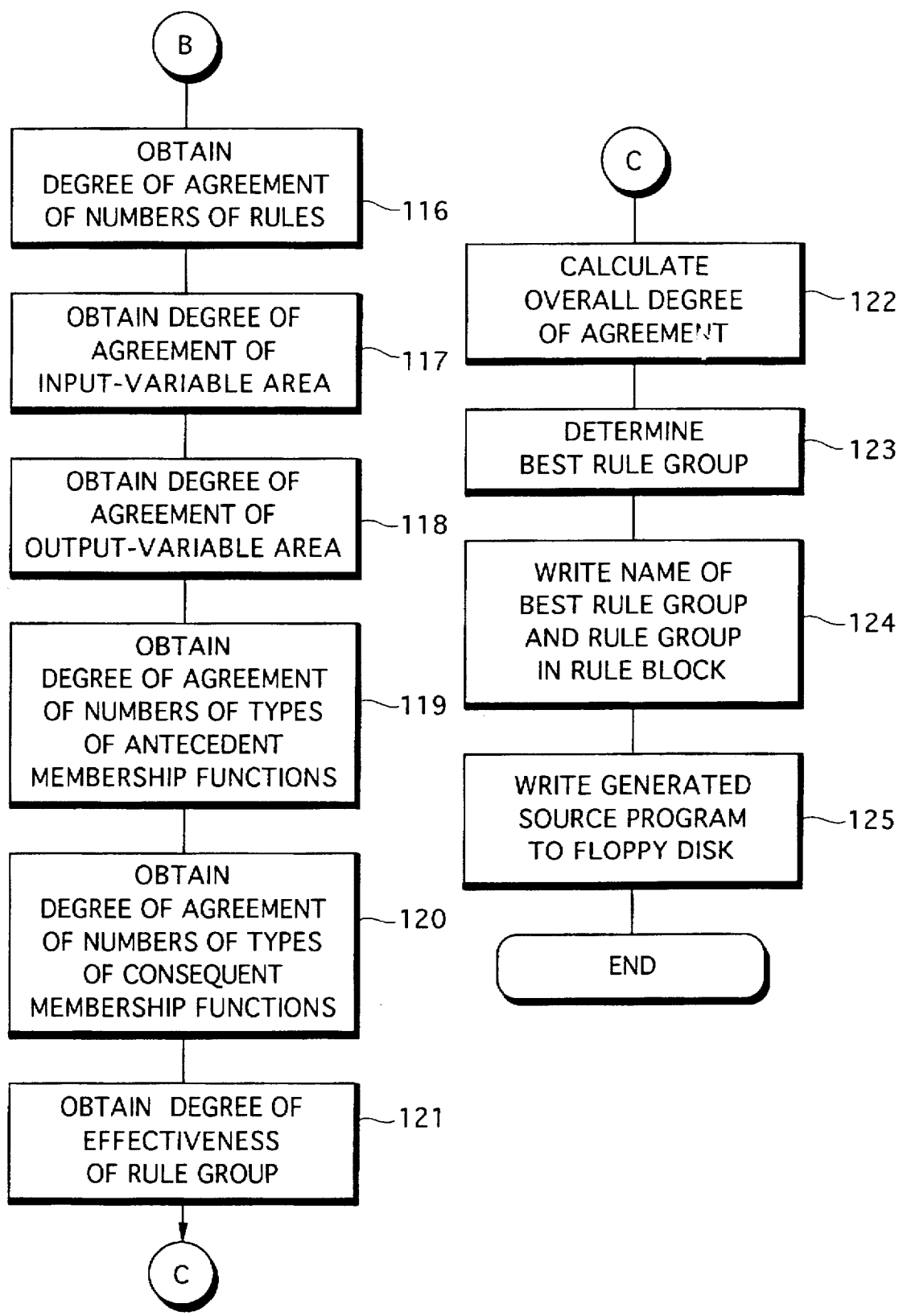

FIGS. 16a and 16b illustrate the procedure of processing executed by the CPU 11 to generate rules.

The FD 16 storing rule groups and the FD 17 storing the source program and data file is loaded in the FDD 15. The source program (X.E) of FD 17 is read line by line and applied to the CPU 11 through the FDD 15 (step 111). The CPU 11 constantly checks to determine whether reading has advanced to the rule block (step 112) and, when the rule block has been reached, reads the essential matters described there and temporarily stores then in the RAM 13 (step 113).

The essential matters are subjected to comparison processing (step 114). Among the essential matters contained in the original source program (X.E), the three matters of field of use, number of types of input variables and number of types of output variable are adopted as subjects for comparison.

With regard to all rule groups, the field of use, number of types of input variables and number of types of output variables contained in the rule group characteristics of the rule group are read in, for every rule group, together with the rule group number, from the FD 16 storing the rule groups, and this information is stored in the RAM 13.

The CPU 11 compares the field of use, number of types of input variables and number of types of output variables in the original source program (X.E) with the three matters corresponding to these in each rule group and determines whether there is a agreement. Only rule groups in which agreement is achieved with all three matters are used as base rule groups for rule generation. The CPU 11 reads in, from the FD 16, the data relating to the rule groups in which there is agreement for all three matters and stores this data in the RAM 13 (step 115). In the rule-group data illustrated in FIGS. 13a and 13b, the rule groups in which the above-mentioned three matters agree with those of the original source program (X.E) are the rule groups of rule group numbers R3 and R56.

Thus, only rule groups in which the essential matters that determine the basic framework of rules to be generated exhibit perfect agreement are discriminated in advance and adopted as candidates. This unit that it is unnecessary to apply subsequent processing to rule groups that are not the object of selection.

Next, the program proceeds to examination relating to the conditional matters. It is not absolutely necessary for the conditional matters to be in perfect agreement; what is judged is the extent to which the conditional matters described in the original source program (X.E) and the corresponding matters of the rule groups agree. This examination is carried out only with regard to the rule groups that have been placed in the RAM 13.

Figure 14A:
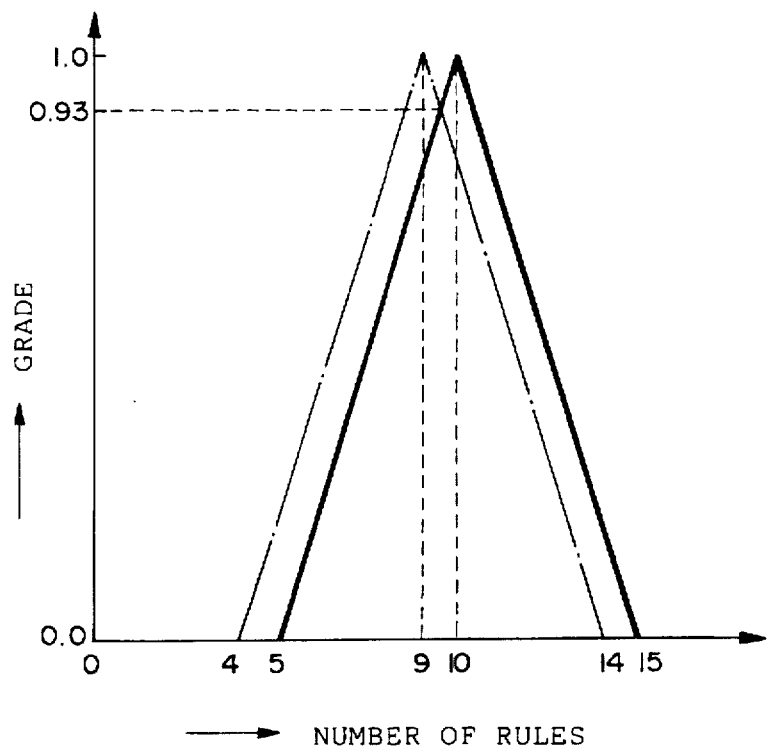
FIGS. 14a and 14b are graphs illustrating a method of calculating degree of agreement.

First, the degree to which the numbers of rules agree is calculated (step 116). The number of rules in the original source program (X.E) is ten. The number of rules contained in each of the rule groups placed in the RAM 13 is counted. For example, assume that the number of rules contained in rule group R3 is nine. These numbers (10 and 9) of rules are converted to respective fuzzy numbers. Though there are various ways to convert numerical values to fuzzy numbers, the technique illustrated in FIG. 14a is employed as an example. Consider a triangular membership function (indicated by the solid lines in FIG. 14a) in which the grade for 10 rules is 1 and the grade for values (15 and 5) obtained by adding and subtracting 5 to and from the number 10 is 0. The fuzzy number of the number 10 of rules is thus represented by this membership function. With regard also to the nine number of rules, consider a similar triangular membership function (indicated by the dashed lines in FIG. 14a). The result of a MIN-MAX operation between these two membership functions is the degree of agreement (0.93) of the number of rules. If the number of rules in the rule group R57 is 10, then the degree of agreement of the number of rules is 1.0.

Figure 14B:
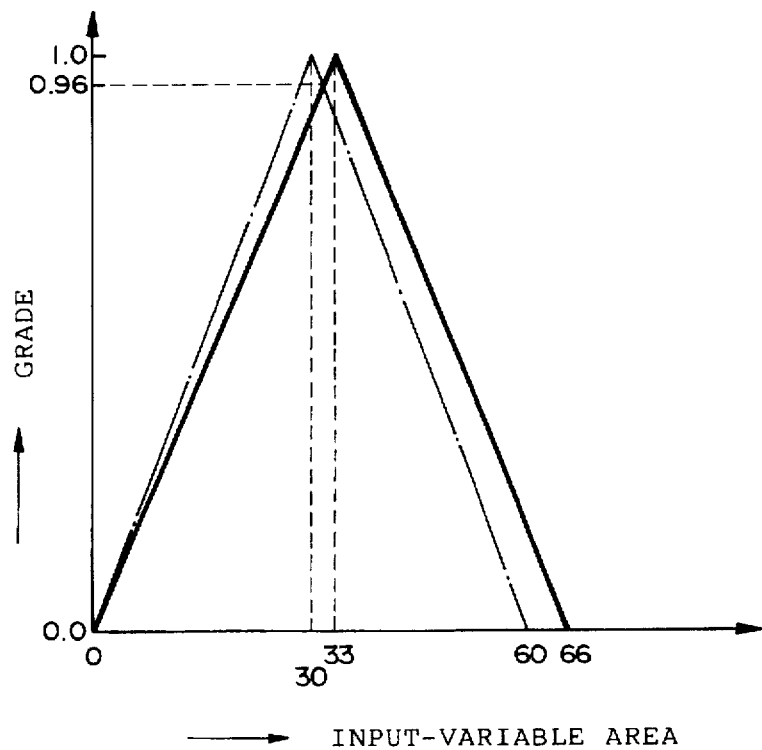

Next, the degree of agreement of the input-variable area is calculated (step 117). The calculation of degree of agreement of the input-variable area is carried out for each type of input variable. For example, the area of the input variable $I_1$, described in the original source program (X.E) is 0~66. By contrast, the area of the input variable $I_1$, in rule group R3 is 0~60. In a case such as this, consider triangular membership functions each of which has the input-variable area as its base, as shown in FIG. 14b, with the grade being 1 at the center of each area. The result of the MIN-MAX operation between these membership functions is the degree of agreement (0.96) of the areas with regard to the input variable $I_1$. The degrees of agreement with the input-variable areas described in the original source program (X.E) are calculated in similar fashion with regard also to the other input variable $I_2$ of the rule group R3 and the input variables in the other rule groups such as rule group R57.

Furthermore, the degree of agreement with the output-variable area described in the original source program (X.E) is calculated in similar fashion with regard also to the output-variable area of each rule group (step 118).

Furthermore, the degree of agreement between the number of types of antecedent membership functions of each rule group and the number of types of antecedent membership functions described in the original source program (X.E) is calculated for each type of input variable (step 119). The calculation of this degree of agreement is performed by converting the number of types of membership functions to fuzzy numbers through a method similar to that used in calculating the degrees of agreement between the rule numbers.

In this connection, with regard to the input variable $I_1$, of rule group R3, the membership functions are of the three types SMALL, MEDIUM and LARGE, and the membership functions of the variable $I_1$, are of three types in the original source program (X.E) as well. Accordingly, the degree of agreement is 1.0.

Calculation is performed in a similar manner also with regard to the number of types of consequent membership functions of each rule group (step 120).

The degrees of agreement calculated as set forth above are stored in the RAM 13 per each rule group in correspondence with the rule group numbers. An example of results of calculating degrees of agreement stored in the RAM 13 is illustrated in FIG. 15.

The degree of effectiveness (%) of a rule group is obtained for every rule group (step 121). As described in connection with the first embodiment, the degree of effectiveness of a rule group is found by performing a fuzzy reasoning operation, for each rule group, in accordance with the rules contained in the rule group using the input-variable data of the data file the name (X.dat3) of which is described in the original source program (X.E), obtaining the ratio between the result of fuzzy reasoning and the output-variable data and calculating the average value of these ratios. The degrees of effectiveness obtained also are stored in the RAM 13 in correspondence with the rule group numbers (see FIG. 15).

The overall degree of agreement (expressed as a percentage), which is found for each rule group as the result of the MIN operation on degrees of agreement obtained through steps 116~120, is stored in the RAM 13 (step 122) (see FIG. 15).

The best rule group is determined on the basis of the foregoing data (step 123). There are various methods which can be used to determine the best rule group. One example involves taking a rule group for which the degree of effectiveness is highest from those rule groups which satisfy the condition that the overall degree of agreement be greater than a predetermined threshold value (e.g., 85%), and adopting this rule group as the best rule group. It is also necessary that the degree of effectiveness of the best rule group is greater than a predetermined threshold value (e.g., 85%). Another method involves performing the MIN operation, for each rule group, between the overall degree of agreement and the degree of effectiveness of the rule group, and adopting the rule group for which the result of the MIN operation is largest as the best rule group.

The rule group number (rule group name), field of use, overall degree of agreement, degree of effectiveness of the best rule group thus determined, as well as the rule group, are written to the rule block in the RAM 13 (step 124). Finally, the rule block is written in the source program of FD 17, whereby a source program possessing the rule group is eventually obtained (step 125). An example of the source program generated is illustrated in FIG. 11.

Thus, in the second embodiment, eligible rule groups are selected first using the essential matters, then overall degree of agreement is calculated for each rule group using the conditional matters, next the degrees of effectiveness of the rule groups are calculated by an inferential operation using the data of the data file, and finally the best overall rule group is determined on the basis of the overall degrees of agreement and degrees of effectiveness of the rule groups. As a result, the most suitable rule group is selected with certainty. Thus, it is possible for the operator to obtain the best rules automatically merely by loading the FDs 16 and 17. In other words, it is possible for the operator to generate the desired rules rapidly even if the operator does not possess special knowledge.

In the second embodiment, already existing rule groups are stored on one FD, and a source program and data file are stored on another FD. This is a convenient arrangement because this information can be carried about as a rule library or data library. Furthermore, every operator can possess his or her own FD.

An arrangement may be adopted in which some of the determined rules (the membership functions, field of use, etc.) are revised by the operator in the same manner as set forth in the first embodiment. At this time, data and instructions indicating the contents of revisions can be entered using the keyboard 18. Furthermore, the name of the creator and the date of creation may be appended to the rule groups or to the rules generated. These items of data may also be entered from the keyboard 18.

Third Embodiment

Figure 17:
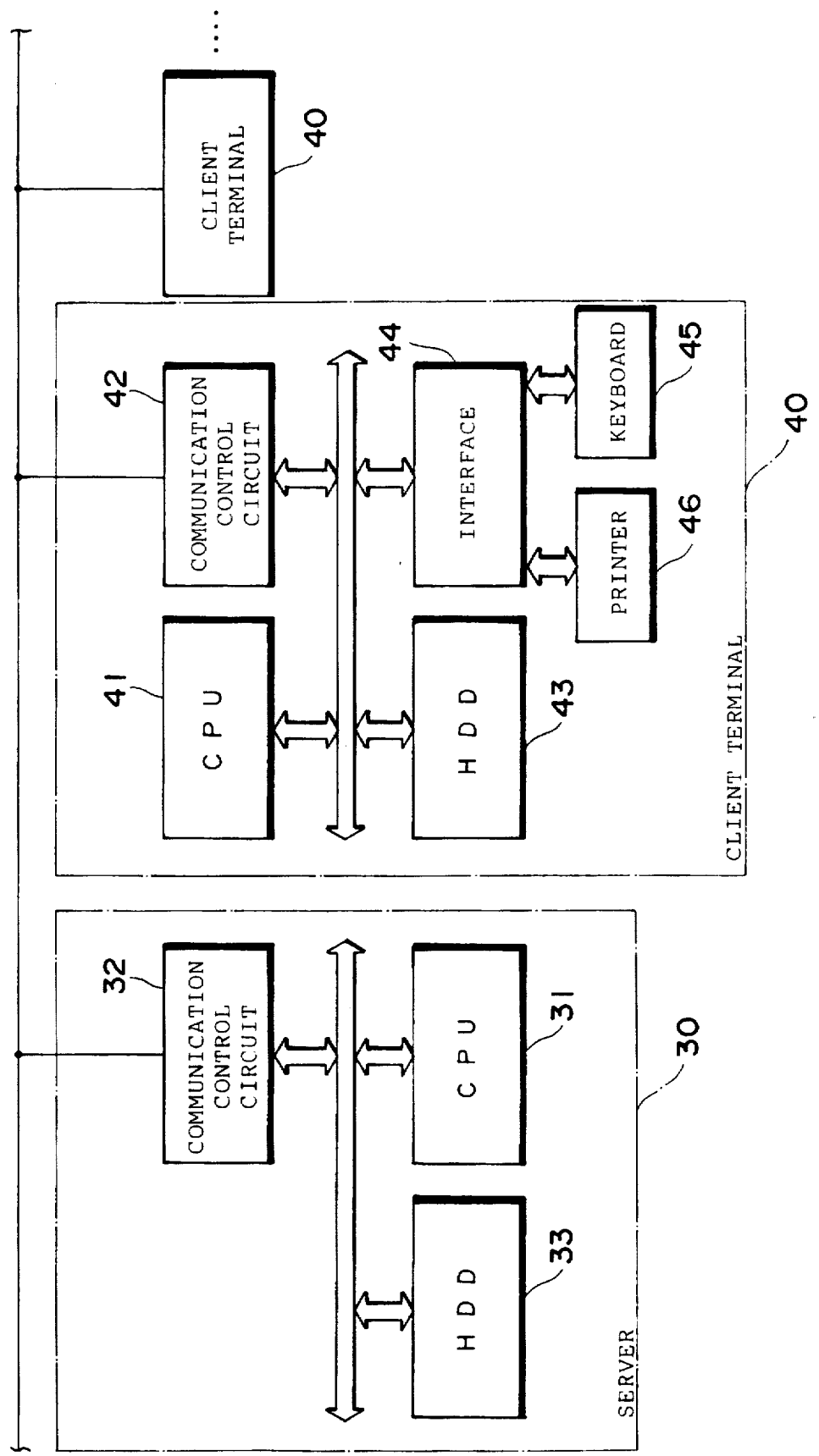
FIG. 17 is a block diagram illustrating a third embodiment.

FIG. 17 illustrates the construction of a rule generating apparatus according to a third embodiment. The third embodiment illustrates an example of system construction, and the rule generating processing procedures illustrated in the first and second embodiments are both applicable to the third embodiment.

A single server 30 and a plurality of client terminals 40 are interconnected by a communication line [e.g., a LAN (local Area Network)].

The server 30 performs rule generation processing and has a CPU 31, a communication control circuit 32 and a hard disk driver (hereinafter referred to as an "HDD") 33 serving as a storage device. A plurality of rule groups are stored on the hard disk of the HDD 33 in advance. The CPU 31 executes rule generation processing of the kind shown in FIG. 8 or in FIGS. 16a and 16b.

The client terminal 40 is for entering the rule generation specifications (the above-mentioned items described in the rule block) as well as the input- and output-variable data (the aforesaid data file) necessary for rule generation, and for sending a rule generation request to the server 30. The client terminal 40 has a CPU 41, a communication control circuit 42, an HDD 43, a keyboard 45, a printer 46 and an interface 44.

The rule generation request, the rule generation specifications and the input- and output-variable data are entered from the keyboard 45 of the client terminal 40, and these items of data are transmitted to the server 30. The input- and output-variable data can also be entered using an FD.

Using these items of data, the server 30 selects the best rule group from among the rule groups stored in the HDD 33 and then transmits this rule group to the client terminal 40 that issued the request.

The data representing the best rule group selected and transmitted to the client terminal 40 by the server 30 is outputted from the printer 46 (or from a display unit).

Thus, by merely entering standards, which relate to rules to be generated, from the client terminal 40, it is possible for the client terminal to acquire rule groups created by the server 30.

It may be so arranged that rule generation processing is executed in the client terminal 40. In such case the server 30 transmits rule groups, which have been stored in the HDD 33, to the client terminal 40 in response to a request from the client terminal 40. An arrangement may be adopted in which the above-described essential matters in the rule block are transmitted to the server 30 from the client terminal 40. In such case the server 30 sends the client terminal 40 only those rule groups satisfying the essential matters from among the rule groups in the HDD 33.

Industrial Applicability

Devices which execute control or inferential reasoning in accordance with the fuzzy reasoning rules are diverse. They may be used for temperature control, humidity control, equipment fault diagnosis, etc. Fuzzy rules for control must be created in each of these many fields of fuzzy control. The rule generating apparatus according to this invention is capable of being utilized in all industrial fields of fuzzy control and fuzzy reasoning that employ fuzzy rules.

I claim:

1. A rule generating apparatus comprising:

rule-group storage means in which plural groups of rules, each group including a plurality of rules, are stored in advance;

first input means for entering specifications for rule generation;

second input means for entering input-variable data and output-variable data used in rule generation;

first selecting means for selecting rule groups, which satisfy the specifications entered by said first input means, from among the rule groups stored in said rule-group storage means;

first operating means for performing operations, in accordance with respective ones of the rule groups selected by said first selecting means, using the input-variable data entered by said second input means;

second operating means for comparing operational results from said first operating means and the output-variable data entered by said the second input means, and calculating degree of effectiveness of each rule group; and second selecting means for selecting an appropriate rule group on the basis of the degree of effectiveness obtained by said second operating means.

2. A rule generating apparatus according to claim 1, further comprising memory means for storing the rule group selected by said second selecting means.

3. A rule generating apparatus according to claim 1, further comprising an output unit for outputting the rule group selected by said second selecting means.

4. A rule generating apparatus according to claim 1, wherein said first input means comprises a recording medium storing specification data, and a reading device for reading the specification data from said recording medium.

5. A rule generating apparatus according to claim 1, wherein said second input means comprises a recording medium storing the input- and output-variable data, and a reading device for reading the input- and output-variable data from the recording medium.

6. A rule generating apparatus according to claim 1, which comprises a host device and a terminal device connected to the host device so as to be capable of communicating therewith;

the host device having said rule-group storage means, said first selecting means, said first operating means, said second operating means and said second selecting means; and said terminal device having said first input means and said second input means.

7. A rule generating apparatus according to claim 1, which comprises a host device and a terminal device connected to the host device so as to be capable of communicating therewith;

said host device having said rule-group storage means; and said terminal device having said first input means, said second input means, said first selecting means, said first operating means, said second operating means and said second selecting means.

8. A rule generating apparatus according to claim 1, which comprises a host device and a terminal device connected to the host device so as to be capable of communicating therewith;

said host device having said rule-group storage means and said first selecting means; and said terminal device having said first input means, said second input means, said first operating means and said second selecting means.

9. A rule generating apparatus according to claim 1, wherein said specifications include essential matters and conditional matters;

said first selecting means selects rule groups that satisfy all of the essential matters; and said first selecting means or said second selecting means selects rule groups on the basis of the conditional matters.

10. A rule generating apparatus comprising:

rule-group storage means in which plural groups of rules, each group including a plurality of rules, are stored in advance;

input means for entering input-variable data and output-variable data used in rule generation;

first operating means for performing operations, in accordance with respective ones of the rule groups stored in said rule-group storage means, using the input-variable data entered by said input means;

second operating means for comparing operational results from said first operating means and the output-variable data entered from said input means, and calculating degree of effectiveness of each rule group; and selecting means for selecting an appropriate rule group on the basis of the degree of effectiveness obtained by said second operating means.

11. A rule generating apparatus according to claim 10, further comprising memory means for storing the rule group selected by said selecting means.

12. A rule generating apparatus according to claim 10, further comprising an output means for outputting the rule group selected by said selecting means.

13. A rule generating apparatus according to claim 10, wherein said input means comprises a recording medium storing the input- and output-variable data, and a reading device for reading the input- and output-variable data from the recording medium.

14. A rule generating apparatus according to claim 10, which comprises a host device and a terminal device connected to the host device so as to be capable of communicating therewith;

the host device having said rule-group storage means, said first operating means, said second operating means and said selecting means; and said terminal device having said input means.

15. A rule generating apparatus according to claim 10, which comprises a host device and a terminal device connected to the host device so as to be capable of communicating therewith;

said host device having said rule-group storage means; and said terminal device having said input means, said first operating means, said second operating means and said selecting means.

16. A rule generating method comprising the steps of:

storing plural groups of rules, each group including a plurality of rules, in storage means in advance;

accepting entry of specifications for rule generation;

accepting entry of input-variable data and output-variable data used in rule generation;

selecting rule groups, which satisfy the entered specifications, from among the rule groups stored in said rule-group storage means;

performing operations, in accordance with respective ones of the selected rule groups, using the entered input-variable data;

comparing said operational results and the entered output-variable data and calculating degree of effectiveness of each rule group; and selecting an appropriate rule group on the basis of the degree of effectiveness obtained.

17. A rule generating method comprising the steps of:

storing plural groups of rules, each group including a plurality of rules, in storage means in advance;

accepting entry of input-variable data and output-variable data used in rule generation;

performing operations, in accordance with respective ones of rule groups stored in said rule-group storage means, using the entered input-variable data;

comparing said operational results and the entered output-variable data and calculating degree of effectiveness of each rule group; and selecting an appropriate rule group on the basis of the degree of effectiveness obtained.

* * * * *